United States Patent
Qiao et al.

(10) Patent No.: US 7,398,321 B2
(45) Date of Patent: Jul. 8, 2008

(54) SEGMENT PROTECTION SCHEME FOR A NETWORK

(75) Inventors: Chunming Qiao, Williamsville, NY (US); Dahai Xu, North Tonawanda, NY (US); Yizhi Xiong, W. Hollywood, CA (US)

(73) Assignee: The Research Foundation of SUNY, Amherst, NY (US)

( * ) Notice: Subject to any disclaimer, the term of this patent is extended or adjusted under 35 U.S.C. 154(b) by 867 days.

(21) Appl. No.: 10/439,898

(22) Filed: May 13, 2003

(65) Prior Publication Data
US 2003/0229807 A1    Dec. 11, 2003

Related U.S. Application Data

(60) Provisional application No. 60/380,491, filed on May 14, 2002.

(51) Int. Cl.
*G06F 15/173* (2006.01)
(52) U.S. Cl. .................. 709/239; 709/238
(58) Field of Classification Search ............... 709/213, 709/223, 232, 233, 253, 214, 239, 225, 241; 714/28, 4; 705/51; 370/217, 452, 355, 389, 370/230; 713/200; 726/11; 331/14
See application file for complete search history.

(56) References Cited

U.S. PATENT DOCUMENTS

| | | | | |
|---|---|---|---|---|
| 4,527,237 A * | 7/1985 | Frieder et al. | ............... | 709/253 |
| 5,144,551 A * | 9/1992 | Cepulis | ............... | 711/163 |
| 5,187,706 A * | 2/1993 | Frankel et al. | ............... | 370/217 |
| 5,968,176 A * | 10/1999 | Nessett et al. | ............... | 726/11 |
| 6,067,572 A * | 5/2000 | Jensen et al. | ............... | 709/241 |
| 6,078,225 A * | 6/2000 | Bontekoe et al. | ............... | 331/14 |
| 6,360,330 B1 * | 3/2002 | Mutalik et al. | ............... | 714/4 |
| 6,370,573 B1 * | 4/2002 | Bowman-Amuah | ............... | 709/223 |
| 6,553,513 B1 * | 4/2003 | Swoboda et al. | ............... | 714/28 |
| 6,587,964 B1 * | 7/2003 | Brooks | ............... | 714/28 |

(Continued)

OTHER PUBLICATIONS

Integrated fault-tolerant multicast and anycast routing algorithms Jia, W.; Xu, G.; Zhao, W.; Computers and Digital Techniques, IEE Proceedings-vol. 147, Issue 4, Jul. 2000 pp. 266-274.*

(Continued)

*Primary Examiner*—Thong H Vu
(74) *Attorney, Agent, or Firm*—Heslin Rothenberg Farley & Mesiti P.C.

(57) ABSTRACT

This invention broadly comprises a novel segment protection scheme (survivability framework) for a network, which we refer to as PROMISE (Protection using MultIple SEgments). It combines the best of existing link and path protection schemes (e.g., bandwidth efficiency and fast recovery). The PROMISE approach divides an active path or AP (along which a survivable connection is established) into several, possibly overlapping active segments or ASs, and then protects each AS with a detour called backup segment or BS (instead of protecting the AP as a whole as in path protection schemes). This facilitates the bandwidth sharing not only among the BSs for different APs, but also among those for the same AP. In addition, recovery time can be shortened due to the limited length of each AS and BS. This technology can be applied to MPLS, ATM, SONET, WDM and other high-speed link layers under the evolving G-MPLS framework.

28 Claims, 4 Drawing Sheets

U.S. PATENT DOCUMENTS

| | | | | |
|---|---|---|---|---|
| 6,615,040 | B1* | 9/2003 | Benveniste | 455/423 |
| 6,657,951 | B1* | 12/2003 | Carroll et al. | 370/222 |
| 6,711,125 | B1* | 3/2004 | Walrand et al. | 370/223 |
| 6,779,114 | B1* | 8/2004 | Chow et al. | 713/189 |
| 6,859,882 | B2* | 2/2005 | Fung | 713/300 |
| 6,862,609 | B2* | 3/2005 | Merkey | 709/214 |
| 6,877,044 | B2* | 4/2005 | Lo et al. | 710/2 |
| 6,901,445 | B2* | 5/2005 | McCanne et al. | 709/225 |
| 7,035,937 | B2* | 4/2006 | Haas et al. | 709/239 |
| 7,039,014 | B1* | 5/2006 | Krishnamurthy et al. | 370/244 |
| 7,162,632 | B2* | 1/2007 | Cao et al. | 713/163 |
| 7,173,929 | B1* | 2/2007 | Testardi | 370/355 |
| 7,209,975 | B1* | 4/2007 | Zang et al. | 709/238 |
| 2002/0016827 | A1* | 2/2002 | McCabe et al. | 709/213 |
| 2002/0023170 | A1* | 2/2002 | Seaman et al. | 709/235 |
| 2002/0138244 | A1* | 9/2002 | Meyer | 703/14 |
| 2002/0174207 | A1* | 11/2002 | Battou | 709/223 |
| 2003/0009582 | A1* | 1/2003 | Qiao et al. | 709/233 |
| 2003/0048782 | A1* | 3/2003 | Rogers et al. | 370/389 |
| 2003/0065811 | A1* | 4/2003 | Lin et al. | 709/232 |
| 2003/0195852 | A1* | 10/2003 | Campbell et al. | 705/51 |
| 2003/0200548 | A1* | 10/2003 | Baran et al. | 725/90 |
| 2003/0206521 | A1* | 11/2003 | Qiao | 370/230 |
| 2003/0229807 | A1* | 12/2003 | Qiao et al. | 713/200 |
| 2004/0057453 | A1* | 3/2004 | Montgomery | 370/452 |
| 2004/0085899 | A1* | 5/2004 | Magill et al. | 370/230 |

OTHER PUBLICATIONS

Data replication strategies for fault tolerance and availability on commodity clusters Amza, C.; Cox, A.L.; Zwaenepoel, W.; Dependable Systems and Networks, 2000. DSN 2000. Proceedings International Conference on Jun. 25-28, 2000 pp. 459-467.*

Simulation of the model of computer mirroring based on difference queues Teh, H.J.; Pochec, P., Electrical and Computer Engineering, 1999 IEEE Canadian Conference on vol. 1, May 9-12, 1999 pp. 174-179 vol. 1.*

Dahai Xu, Yizhi Xiong, and Chunming Qiao, "Novel Algorithm for Shared Segment Protection", IEEE Journal on Selected Areas in Communications, 2003, pp. 1-12.

Pin-Han Ho and Hussein T. Mouftah, "A Framework for Service-Guaranteed Shared Protection in WDM Mesh Networks", IEEE Communications Magazine, vol. 40, No. 2, Feb. 2002, pp. 97-103.

Canhui Ou, Hui Zng, and Biswanath Mukherjee, "Sub-Path Protection for Scalability and Fast Recovery in WDM Mesh Networks", Optical Fiber Communications Conference, OFC 2002, Mar. 2002, pp. 495-496.

Krishna P. Gummadi, Madhavarapu J. Pradeep, and C. Siva Ram Murthy, "An Efficient Primary-Segmented Backup Scheme for Dependable Real-Time Communication in Multihop Networks", IEEE/ACM Trans. on Networking, vol. 11, No. 1, Feb. 2003, pp. 81-94.

Pin-Han Ho and H.T. Mouftah, A Framework of a Survivable Optical Internet Using Short Leap Shared Protection (SLSP), IEEE Workshop on High Performance Switching and Routing, 2001, pp. 21-25.

H. Wang, E. Modiano, M. Medard, "Partial Path Protection for WDM Networks: End-to-End Recovery Using Local Failure Information", ISCC Jul. 2, 2002.

W. Grover and G. Shen, "Extending the p-Cycle Concept to Path-Segment Protection", IEEE, 2003.

Vishal Anand, Sunit Chauhan, and Chunming Qiao, "Sub-path Protection: A New Framework for Optical Layer Survivability and its Quantitative Evaluation", Technical Report, Jan. 1, 2002, pp. 1-22.

* cited by examiner

SEGMENT PROTECTION SCHEME FOR A NETWORK

CROSS-REFERENCE TO RELATED APPLICATIONS

This application claims the benefit under 35 U.S.C. §119 (e) of U.S. Provisional Application No. 60/380,491, filed May 14, 2002.

FIELD OF THE INVENTION

The present invention relates generally to computer and telecommunication networks and, more particularly, to a segment protection scheme for such networks which offers fast recovery, bandwidth efficiency, with path and link protection.

BACKGROUND OF THE INVENTION

As our national security, economy and even day-to-day life rely more and more on computer and telecommunication networks, avoiding prolonged disruptions to information exchange due to unexpected failures, such as a broken fiber link, becomes increasingly important. Hence, it is critical for a network to be survivable (or fault-tolerant).

Two known survivability schemes are protection and restoration. The major difference between the two is that in protection, recovery from a failure (e.g., the detour set-up and spare capacity allocation) is done at the time of connection setup or network design (i.e., prior to the failure), whereas in restoration, it is dynamically determined after the failure occurs. In general, protection schemes can recover more quickly as the detour is already determined (as long as the detour is not broken), but are less bandwidth efficient than restoration schemes. On the other hand, restoration schemes can survive one or multiple failures (as long as the destination is still reachable, and there is sufficient bandwidth), but they cannot guarantee the recovery time (including the time to find a detour), and/or the amount of information loss for real-time applications, making them unsuitable for mission-critical applications.

In designing a survivable network, the major challenges to be addressed are how to allocate minimal amount of spare resources (e.g., bandwidth) (and thus achieve a maximal efficiency), using scalable (e.g., fast polynomial-time) algorithms, and in case a failure occurs, be able to quickly recover from it (i.e., by re-routing affected traffic using the spare resources). These issues are challenging because the objectives to optimize bandwidth usage, algorithm complexity and recovery time often conflict with each other.

For instance, a common fault-recovery approach is called (failure-independent) path protection, whereby for every mission-critical active path (AP) to be established, a link (or node) disjoint backup path (BP) is also to be established. One way to reduce the amount of spare bandwidth needed is to use shared path protection, which allows the new BP to share the bandwidth allocated to some existing BPs. In order to guarantee the recovery of all critical traffic after a link (or node) failure, two BPs can share bandwidth only if their corresponding APs are link (or node) disjoint (see FIG. 1a for an example). However, finding an optimal pair of link (or node) disjoint paths that minimizes the total bandwidth consumption by the request, given that bandwidth sharing is possible, is an NP-hard problem. In addition, the optimal pair, (if found, by using branch-and-bound techniques), often includes a long BP (consisting of many "zero or super low cost" links on which the bandwidth allocated to existing BPs can be shared), and this results in a long recovery time. Existing efforts in achieving maximal bandwidth efficiency often resort to integer linear programming (ILP) which is not tractable/feasible for large-scale networks. Other existing heuristic approaches sacrifice bandwidth efficiency, or trade recovery time for bandwidth efficiency.

Others have attempted solutions in the past, and we examine these efforts briefly in terms of bandwidth efficiency, algorithm or implementation complexity, and recovery time. Usually, protection schemes can be classified into two types: those used for ring networks, and those used for mesh networks.

Protection schemes for rings are known. The concept of Self Healing Rings or SHR has been applied at the SDH/SONET, Tsong-Ho Wu, *Fiber Network Service Survivability*, Artech House, 1992, Tsong ho Wu, "Emerging technologies for fiber network survivability," in *IEEE Communications Magazine*, Vol. 33, February 1995, pp. 58-59, 62-74, ATM, R. Kawamura, "Architectures for ATM network survivability," in *IEEE Communications Surveys*, 1998, pp. 2-11, R. Kawamura and H. Ohta, "Architectures for ATM network survivability and their field deployment," in *IEEE Communications Magazine*, Vol. 37, No. 8, August 1999, pp. 88-94, as well as WDM layers, P. Demeester et al., "Resilience in multilayer networks," in *IEEE Communications Magazine*, Vol. 37, No. 8, 1999, pp. 70-75.

They can recover quickly (e.g., in 50 ms in SONET), as recovery is either based on 1+1 protection as in Unidirectional Path-Switched Rings or UPSRs, where the receiver (destination) selects a better signal among those arriving along two diverse routes, or based on loopback as in Bidirectional Line-Switched Rings or BLSRs, (also called Shared Protection Rings or SPRINGs), which uses a mechanism called Automatic Protection Switching (APS).

Depending on where a detour originates, mesh protection schemes can be classified into link protection (which re-routes from the immediate upstream node of a failed link), path protection (which re-routes at the source of a connection) or their variations (such as ring-based and non-ring based protection, etc.).

Figure 1A:
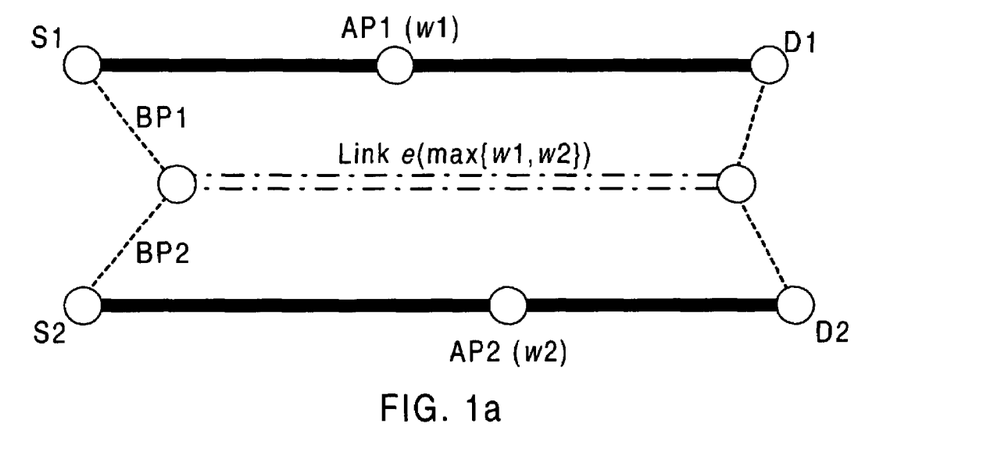
FIG. 1a illustrates a shared path protection scheme where AP and BP are node-disjoint.
Figure 1B:
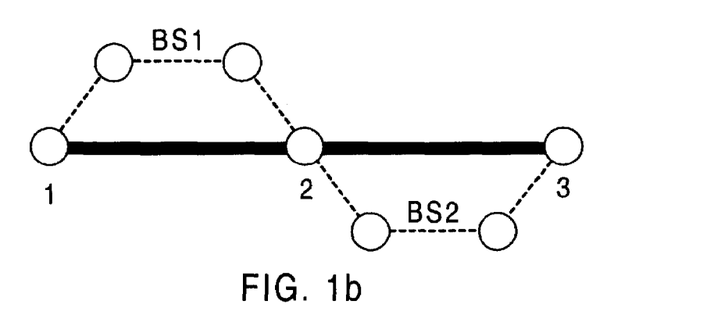
FIG. 1b illustrates a link protection scheme.

In link protection, for every link carrying traffic under normal (working) situations, called active links, a backup segment or BS (here, the term "segment" loosely refers to one or more consecutive links), from one end of the link to the other end, is used as the detour. This is illustrated in FIG. 1b, where the two active links from node 1 to node 2, and from node 2 to node 3, respectively, are shown in bold, and their corresponding backup segments, denoted by BS1 and BS2, respectively, are show in dashed lines.

Figure 1C:
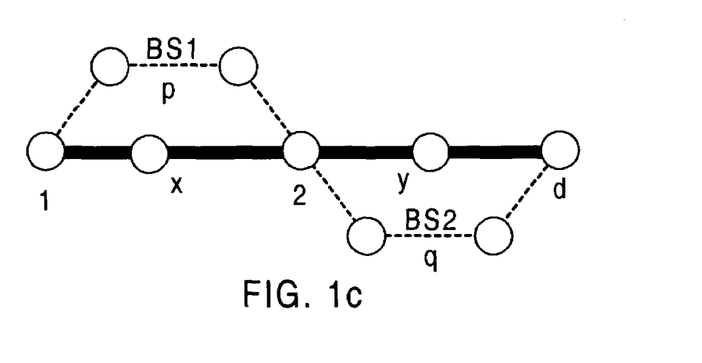
FIG. 1c illustrates a path protection scheme where AP and BP are link-disjoint.

In path protection, for every active path or AP from source S to destination D, a BP from S to D is used as the detour. Path protection can be either failure-dependent or failure independent. Failure independent approach means the BP has to be link (node) disjoint with the AP, in order to protect against any single link (respectively, node). FIGS. 1a and 1c show two examples where BPs are node-disjoint and link-disjoint with their corresponding APs, respectively. Failure independent path protection is more common than its failure-dependent counterpart as the former can usually achieve a much faster recovery at little extra cost (in terms of bandwidth consumption) especially if the bandwidth along the non-broken part of the AP is released after the traffic is re-routed onto the BP.

The major difference between link and path protection (even though FIGS. 1b and 1c look similar) is that in link protection, when only the (bold) link from nodes 2 to 3 fails, for example, traffic from nodes 1 to 3 will use the (bold) link from nodes 1 to 2, and then be re-routed to BS2; while in path protection, if the (bold) link from node 2 fails, the traffic from S will be re-routed to BS1 and BS2.

In addition, in link or path protection, backup bandwidth can be shared or non-shared. Usually shared schemes are much more bandwidth efficient (and cost-effective) than non-shared schemes. An example of shared path protection is shown in FIG. 1a. Since a single link (or node) failure will not affect both AP1 and AP2 at the same time, whose bandwidth requirements are assumed to be w1 and w2 (units), respectively, their corresponding BPs can share bandwidth on the common link e. More specifically, the amount of backup bandwidth that needs to be reserved on link e is $\max\{w_1, w_2\}$ (instead of $w_1+w_2$).

Ring-Based Protection is a variation of link or path protection, which uses the links in a mesh network to form a set of rings, and in general relies on loopback or APS for recovery as similarly done in BLSRs. Ring-based approaches include node cover, O. J. Wasem, "Optimal topologies for survivable fiber optic networks using SONET self-healing rings," in GLOBECOM'91, Vol. 3, 1991, pp. 57.5.1-57.5.7, O. J. Wasem, "An algorithm for designing rings for survivable fiber networks," in IEEE Trans. on Reliability, Vol. 40, October 1991, pp. 428-432 and ring cover, G. Ellinas et al., "Protection cycle covers in optical networks with arbitrary mesh topologies," in OFC'00, March 2000, G. Ellinas and T. E. Stern, "Automatic protection switching for link failures in optical networks with bi-directional links," in GLOBECOM'96, 1996, Vol. 1, 1996, pp. 152-6, G. Ellinas, A. G. Hailemariam, and T. E. Stern, "Protection cycles in mesh WDM networks," in IEEE Journal on Selected Areas in Communications, Vol. 18, No. 10, October 2000, pp. 1924-1937, W. D. Grover and D. Stamatelakis, "Cycle-oriented distributed precon-figuration: Ring-like speed with mesh-like capacity for self-planning network reconfiguration," in IEEE International Conference on Communications (ICC'98), Vol. 1, 1998, pp. 537-43. The former chooses a set of rings that can cover all the nodes in a mesh network, but the traffic carried on any uncovered links in the mesh network cannot be protected against failure. The latter also chooses a set of rings, which may cover all the links as in the so-called Cycle Double Cover (CDC) approach, Ellinas, et al., supra, or only some of them as in the so-called Pre-configured protection cycle (P-Cycle) approach, Grover and Stamatelakis, supra, but in either case, every link failure can be recovered.

CDC approach covers each link in a mesh network with exactly two cycles of opposite directions. Though it improved upon the cycle cover methodology, L. M. Gardner, M. Heydari, and et al., "Techniques for finding ring covers in survivable networks," in GLOBECOM'94, San Francisco, Calif., November 1994, pp. 1862-1866, it has a limited applicability because if the network is (or becomes) non-planar, it is only conjectured that a CDC exists, F. Jaeger, "A survey of the double cycle cover conjecture," in Cycles in Graphs, North-Holland, Ed Annals of Discrete Mathematics 115, 1985, 1985, p. January 12. Even for a planar graph, it is difficult, if possible at all, to have small protection cycles (so that recovery can take place along shorter detours).

The P-Cycle approach provides a way to protect both covered (or on-cycle) and uncovered (off-cycle) links, resulting in better bandwidth efficiency, Grover and Stamatelakis, supra, D. Stamatelakis and W. D. Grover, "IP layer restoration and network planning based on virtual protection cycles," in IEEE Journal on Selected Areas in Communications, Vol 18, No. 10, October 2000, pp. 1938-1949. However, detours can also be long, and in addition, the number of p-cycles needed can be large, which requires complicated co-ordination amongst these p-cycles for the purpose of recovery. Also, obtaining optimal solutions is an NP-hard problem, D. Stamatelakis and W. D. Grover, "Theoretical underpinnings for the efficiency of restorable networks using preconfigured cycles ("p-cycles")," in IEEE Transactions on Communications, Vol. 48 No. 8, August 2000, pp. 1262-1265, and different algorithms to select the p-cycles are needed for link and node failures (unlike in path protection where a simple transformation exists).

More recently, heuristic algorithms to route APs in wavelength-division multiplex (or multiplexed (WDM) mesh networks already "covered" with a set of rings were proposed in F. Poppe, H. D. Neve, and G. H. Petit, "Constrained shortest path first algorithm for lambda-switched mesh optical networks with logical overlay OCh/SP rings," in IEEE Workshop on High Performance Switching and Routing, 2001, pp. 150-154. Heuristics to protect LSPs in MPLS networks by constructing rings from spanning trees rooted at every possible egress nodes were also studied in Radim Bartos and Mythilikanth Raman, "A heuristic approach to service restoration in MPLS networks," in IEEE International Conference on Communications (ICC'01), Helsinki, Finland, June 2001, pp. 117-121. Though it was shown that the approach improved over the so-called Fast Rerouting, Dimitry Haskin and Ram Krishnan, "A method for setting an alternative label switched paths to handle fast reroute," in Draft-haskin-mpls-fast-reroute-05, November 2000, and RSVP backup tunnels, D. O. Awduche, L. Berger, and et al, "RSVP-TE: Extensions to RSVP for LSP tunnels," in Draft-ietfmpls-rsvp-lsp-tunnel-07, August 2000, Der-Hwa Gan, Ping Pan, and et al., "A method for MPLS LSP fast-reroute using RSVP detours," in Draft-gan-fast-reroute-00, April 2001, it has a limited flexibility (as other rings-based approaches). More specifically, because it requires that the protection paths for all APs that terminate at a given egress router be determined simultaneously, one cannot take advantage of the bandwidth available somewhere else to support efficient dynamic establishment of connections.

There are several approaches that do not require a ring cover (although BLSR-like loopback may still be used for recovery). In M. Medard, S. G. Finn, R. A. Barry, and R. G. Gallager, "Redundant trees for preplanned recovery in arbitrary vertex-redundant or edge-redundant graphs," in IEEE/ACM Trans. on Networking, Vol. 7 No. 5, 1999, pp. 641-652, S. G. Finn, M. Medard, and R. A. Barry, "A novel approach to automatic protection switching using trees," in ICC'97, 1997, pp. 272-276, redundant trees are constructed in such a way that for any link or node failure, every node remains connected to at least one of the trees. In S. G. Finn, M. Medard, and R. A. Barry, "A new algorithm for bi-directional link self-healing for arbitrary redundant networks," in OFC'98, 1998, p. ThJ4, M. Medard, S. G. Finn, and R. A. Barry, "WDM loop-back recovery in mesh networks," in INFOCOM'99, 1999, pp. 752-759, M. Medard, S. S. Lumetta, and Y. C. Tseng, "Capacity-efficient restoration for optical networks," in OFC'00, 2000, pp. 207-9, ThO2, the Generalized Loopback approach, which constructs a primary digraph and the conjugate secondary digraph in a two/four-fiber mesh network, was proposed. When a link failure occurs, recovery starts from one end of a failed link, and follows the secondary digraph in a manner similar to loopback in BLSRs. In S. S. Lumetta, M. Medard, and Y. Tseng, "Capacity versus robustness: A tradeoff for link restoration in mesh networks," in IEEE Journal of Lightwave Technology, Vol. 18, No. 12, December 2000, pp. 1765-1775, an extension of this approach was proposed, which logically removes some non-critical links in the secondary digraph (so they can carry non mission-critical traffic). This improves the bandwidth efficiency significantly, but results in longer detours and associated degradation of signal transmission quality.

Also related are the two approaches in Ching-Fong Su and Xun Su, "Protection path routing on WDM networks," in *Proceedins—OFC*, 2001, pp. TuO2-1, Ching-Fong Su and Xun Su, "An online distributed protection algorithm in WDM networks," in *ICC'01*, 2001, and Murali Kodialam and T. V. Lakshman, "Dynamic routing of locally restorable bandwidth guaranteed tunnels using aggregated link usage information," in *INFOCOM'01*, 2001, pp. 376-385, respectively, where a detour for each link starts from its upstream node but either ends at the node next to the downstream node of the link, or can end at any downstream node (up to the destination of the connection). While they represent an interesting deviation from link/path protection and their ring-based variations, only Integer Linear Programming (ILP) formulations and/or ad hoc heuristics have been proposed. In addition, the bandwidth efficiency of both approaches, especially the first, can be low due to the need to find a detour for each link, and neither approach, especially the second, made any attempts to limit the length of the detour.

Finally, in Pin-Han Ho and H. T. Mouftah, "A framework of a survivable optical internet using short leap shared protection (SLSP)," in 2001 *IEEE Workshop on High Performance Switching and Routing*, 2001, pp. 21-25, it is suggested that an AP is divided into several segments, each of which is protected using BLSRs. Again, only rudimentary exhaustive search algorithms (with backtracking) and heuristics were suggested, and no performance results in terms of bandwidth efficiency, and recovery time (or the length of the detours) were provided. There have also been many IETF drafts on MPLS protection/restoration schemes (including e.g., Haskin et al., Awduche et al., and Gan et al., suppra. But none of them contains, (or is supposed to contain), any implementation details such as algorithms or performance results, and it is clear that much work needs to be done in exploring the advantage of these protection schemes.

The protection schemes for ring networks have only 50% (or lower) bandwidth efficiency (i.e., the spare bandwidth used for protection is no less than that required to carry the working traffic). The bandwidth inefficiency problem is further exacerbated by the need to upgrade the bandwidth on all the links in a SDH/SONET ring (called the "fork-lift" requirement). In addition, detours (loopbacked routes) can be very long, which not only wastes bandwidth, but also affects signal transmission performances such as signal-to-noise ratio (SNR) and bit-error-rate (BER), making all-optical data communications difficult.

For protection schemes used in mesh networks, link protection uses "local" recovery (re-routing), which is why, in general, it can be faster than path protection which recovers at the source node only (with a few exceptions including the case of 1+1 link/path protection). In general, assuming that some intermediate nodes are capable of failure detection and re-routing, recovery time is proportional to the length of the backup segment that protects against a failure (and possibly the active segment which is affected by the failure as well).

On the other hand, link protection is less bandwidth efficient than path protection, B. Doshi and et al., "optical network design and restoration," *Bell Labs Technical Journal*, pp. 58-84, January-March 1999, S. Ramamurthy and B. Mukherjee, "Survivable WDM mesh networks, part I—protection," in *INFOCOM'99*, New York, USA, March 1999, pp. 21-25, S. Ramamurthy and B. Mukherjee, "survivable WDM mesh networks, part II: restoration," in *ICC'99*, Vol. 3, 1999, pp. 2023-30, Yijun Xiong and Lorne G. Mason, "Restoration strategies and spare capacity requirements in selfhealing ATM networks," in *IEEE/ACM Trans. on Networking*, Vol. 7, No. 1, 1999, pp. 98-110, S. Kuroyanagi and T. Nishi, "Optical path restoration schemes and cross-connect architectures," in *GLOBECOM'98*, November 1998, pp. 2282-88. For example, as shown in FIG. 1, in link protection, a BS uses 3 links for every active link, thus the backup to active bandwidth ratio is 3 (when there is no backup bandwidth sharing), whereas in path protection, this ratio is 1.5 (also without backup bandwidth sharing).

As a variation of link or path protection, ring-based approaches generally are not bandwidth efficient. In addition, they do not adapt well to the changes in the network topology due to their need to perform major reconstruction of the desired set of rings. It is also found in S. S. Lumetta and M. Medard, "Towards a deeper understanding of link restoration algorithms for mesh networks," in *INFOCOM'01*, Vol. 1, 2001, pp. 367-375, that they result in a significantly poor performance in terms of the ability to recover from subsequent failures.

As for existing non-ring based protection schemes, no existing schemes can achieve better bandwidth efficiency than shared path protection while having a much shorter backup segment, as well as a scalable algorithm.

SUMMARY OF THE INVENTION

This invention broadly comprises a novel segment protection scheme (survivability framework) for a network, which we refer to as PROMISE (Protection using MultIple SEgments). It combines the best of existing link and path protection schemes (e.g., bandwidth efficiency and fast recovery). A basic idea behind PROMISE is to divide an active path or AP (along which a survivable connection is established) into several, possibly overlapping active segments or ASs, and then protect each AS with a detour called backup segment or BS (instead of protecting the AP as a whole as in path protection schemes). This facilitates the bandwidth sharing not only among the BSs for different APs, but also among those for the same AP. In addition, recovery time can be shortened due to the limited length of each AS and BS. This technology can be applied to MPLS, ATM, SONET, WDM and other high-speed link layers under the evolving G-MPLS framework.

DETAILED DESCRIPTION OF THE PREFERRED EMBODIMENT

In the detailed description that follows, the following acronyms are used:

| | |
|---|---|
| PROMISE: | PROtection with MultIple SEgments |
| APF-PBC: | Active Path First with Potential Backup Cost |
| WDM: | Wavelength-division multiplex (or multiplexed) |
| MPLS | Multi-protocol label switching |
| MPλS: | Multi-protocol Lambda (i.e., wavelength) switching |
| DCIM: | Distributed Complete Information Management |
| DPIM: | Distributed Partial Information Management |
| AS: | Active Segment |
| BS: | Backup Segment |
| AP: | Active Path |
| BP: | Backup Path |

In a preferred embodiment, we consider a network G with E directed links (represented by set $\epsilon$) and V nodes, which can be classified into two categories: edge nodes (ingress or egress), to which users or terminal devices are connected, and core nodes (which are nodes other than an edge node).

To facilitate our presentation, we will use a tuple (s→d, w) to represent a new request for connection establishment (or release), where s and d are the source (or ingress) and destination (or egress) of the connection, respectively, and w is the bandwidth (in units) requested by the connection.

The following additional notation will be used, where an italicized font style (e.g., A is used to denote a set or a vector while a non-calligraphic style (e.g., A) is used to denote a scalar value:

OUT(n), IN(n) ⊂ E: Set of links going from and coming into node n∈V, respectively.

AP and BP: Set of links along an AP and BP, respectively.

$A_e$: Set of connections whose APs traverse link e, $$A_e = \sum_{k \in A_e} w_k :$$

Total (i.e., aggregated) ABW on link e dedicated to the connections in $A_e$.

$B_e$: Set of connections whose BPs traverse link e.

$B_e$: Total BBW allocated on link e for $B_e$. Due to BBW sharing, $$B_e \le \sum_{k \in B_e} w_k.$$

$R_e$: Residue bandwidth of link e. Its initial value is equal to the capacity of link e, $C_e$.

$R_e = C_e - A_e - B_e$ (with only protected connections).

$S_a^b = A_a \cap B_b$: Set of connections whose APs traverse link a and whose BPs traverse link b, where a, b∈E.

$$S_a^b = \sum_{k \in S_a^b} w_k :$$

Total amount of bandwidth required by the connections in $S_a^b$. It is a fraction of $A_a$ as well as $B_b$ that is used by the APs and BPs, respectively, of the connections in $S_a^b$.

$BC_a^b$: Additional BBW needed on link b in order to use it as a part of a BP for a new connection whose AP traverses link a. Its value depends on which BBW estimation method is used.

$BC^e$: Estimated BBW needed on link e along a new BP. Assuming that its corresponding AP is known, $$BC^e = \max_{\forall a \in AP} B_a^e.$$

Whether this value is the minimum BBW needed on link b or not depends on which BBW estimation method is used to derive $B_a^e$. In addition, this is equal to the actual BBW allocated on link b in SCI, SR and SPI but not in the DPIM schemes (which may result in an over-estimation but always allocates the minimal BBW).

$P_B(e) = \{S_a^e | a \in E$: Profile of BBW on a given link e. This is a vector consisting of a list of $S_a^e$ values, one for each link a. Basically, it specifies the amount of BBW on link e that is used to protect against the failure of every other link (e.g., $a_1 a_2 \ldots a_E \in E$) in the network.

$$P_{B_e} = \max_{\forall a} S_a^e :$$

This is the maximum value over all the components in $P_B(e)$. It is also the minimum (or necessary) amount of BBW needed on link e to backup all active paths. If a BBW allocation scheme (such as the DPIM schemes to be described) always allocates minimum BBW on link e, then $B_e = P_{B_e}$.

$P_A(e) = \{S_e^b | b \in E$: Profile of ABW on a given link e. This is a vector consisting of a list (or set) of $S_e^b$ values, one for each link b. It complements $P_B(e)$, and specifies the amount of ABW on link e that is protected by every link (e.g., $b_1 b_2 \ldots b_E \in E$) in the network.

$$P_{A_e} = \max_{\forall b} S_e^b :$$

This is the maximum value over all the components in $P_A(e)$. It is also the sufficient amount of bandwidth that needs be reserved on any link in the network in order to protect against the failure of link e.

$\overline{P_{A_e}}$: This is the average value over all the components of a given ABW profile on link e. It is only useful to describe the APF-PBC heuristic.

$$M = \max_{\forall a,b} S_a^b :$$

This is also equal to $$\max_{\forall e} P_{A_e} \text{ or } \max_{\forall e} P_{B_e}.$$

We describe herein theories and algorithms as well as practical techniques for a novel protection framework called PROMISE (for PROtection with MultIple SEgments). To facilitate the following description, we focus on link failures unless specified otherwise.

As mentioned earlier, the basic idea of PROMISE is to provide protection for one active segment (or AS) at a time, using a detour called backup segment (or BS). The BS starts and ends at the same two nodes as the corresponding AS, but is otherwise node-disjoint, not just link-disjoint (even though only link failures are considered) for reasons to become clear later.

Since either a path or a link may be considered as a special case of a segment, the proposed PROMISE framework encompasses both link and path protection schemes. More specifically, if we limit the size of each AS to one link, PROMISE can emulate link protection (see FIG. 1b). To emulate path protection where a node-disjoint BP is desired, we can treat an entire AP as one segment (similar to FIG. 1a). Finally, if path protection with a link-disjoint (but not node-disjoint) BP is to be emulated, we can partition the AP into non-overlapping multiple segments (similar to FIG. 1c). This implies that whatever a path or link protection scheme can accomplish, so can a PROMISE-based approach.

The invention is the extension of our prior work on a ground-breaking shared path protection framework called DPIM. In addition to supporting protected (i.e., 100% survivable) connections, DPIM can also support unprotected connections, (which do not need BPs), in such a way that these will be affected only if one of the links along their APs is broken. Furthermore, pre-emptable connections are also supported by DPIM. Such a connection not only requires no BP (as an unprotected connection), but also can use the backup bandwidth reserved for other high-priority traffic under normal situations. However, when a failure occurs, it can be affected even if the failed link is not a part of its path because its bandwidth will be taken away by the detours for re-routing the affected high-priority traffic.

DPIM can be implemented under distributed control as is known in the art, which is more scalable than centralized control because a centralized controller can become not only a bottleneck due to processing and signaling overhead (e.g., delay), but also a single point of failure. In addition, DPIM only requires that each node maintain (and exchange) $O(E)$ partial (and aggregate) information on existing connections and network status, where E is the number of links in a network. This is an order of magnitude less than the amount of information required by other similar schemes (which is about $O(E^2)$) (although DPIM can work with, and in fact perform better with the so-called complete information). As mentioned earlier, when applied to on-line case where no existing connections can be rearranged and no future request is known, APF-PBC can outperform even ILP-based approaches, in terms of total bandwidth consumption by all the requests if there is no request rejection, and total earnings/profits otherwise.

One of the main techniques developed for DPIM, which we propose to extend and apply to PROMISE, is the use of the so-called active path first with potential backup cost (APF-PBC) as an ultra-fast but extremely efficient heuristic. The basic idea of APF-PBC is as follows. Instead of using ILP or other straightforward heuristics to address the problem of finding an optimal (shortest) pair of AP and BP (when backup bandwidth sharing is allowed), the APF-PBC heuristic assigns a PBC, (whose value is determined by the cost-estimation function to be described next), to each link and then selects an optimal (shortest) AP first, followed by an optimal BP, making use of any well-known shortest-path algorithms in both cases. In this way, it decomposes the joint-optimization problem into a much simpler (tractable) two-phase optimization problem. Also, it does so without total ignorance of inter-phase correlation, thereby avoiding the pitfalls of using other straight-forward heuristics such as APF (without PBC), as the APF-PBC takes into consideration the impact of selecting a particular link for use by the AP on the yet-to-chosen BP during the first phase of optimization.

The key question is of course what PBC should be assigned to each link (before an AP is selected). In our published work, Dahai Xu and Chunming Qiao, Distributed partial information management (DPIM) schemes for survivable networks—part II," Tech Report 2000-14, CSE Dept. University at Buffalo, June 2001, incorporated herein in its entirety, we derived a function to compute PBC mathematically based on the statistical analysis of experimental (simulation) data (we note that the formulae to calculate RTT and timeout values for TCP congestion control, as well as the theories of quantum physics and Einstein's theory of special relativity, for example, were all developed on experimental data.) More specifically, let w be the bandwidth of the requested connection, and $S_a^b$ the total bandwidth required by the existing connections whose APs traverse link a and whose BPs traverse link b. Then, the PBC assigned to link e is $$B_e(w) = w + c \frac{w \cdot P_{A_e}}{M},$$

where c is a constant between 0 and 1, $$P_{A_e} = \max_{\forall b} S_e^b, \text{ and } M = \max_{\forall e} P_{A_e}.$$

Once an AP is selected using a shortest-path algorithm, the APF-PBC proceeds by logically removing all the links along the AP first. Then, a minimal cost BP is found after assigning each remaining link e a cost of $$\max_{\forall a \in AP} \{P_{A_e} + w - B_e,$$

where $B_e$ is the amount of backup bandwidth already assigned to link e (the distributed signaling protocol used in DPIM further allocates minimum backup, which is $$\max_{\forall a \in AP} \{S_a^e + w - B_e\}$$

on each line e selected as a part of the BP.

Recently, we have also studied parameterized ILP formulations for path protection to improve recovery time without significantly affecting bandwidth efficiency. Although the results obtained are better than existing approaches, the need for a new approach with an even shorter recovery time and better bandwidth efficiency at the same time clearly exists.

It is worth noting that the proposed PROMISE approach is more than just a trivial combination (or compromise) of link and path protection. For example, a salient feature of PROMISE is that an AP may be divided into overlapping ASs, which in turn, resulting in BSs that criss-cross with one another (see FIG. 2a for illustration).

One of the primary benefits of PROMISE is that by protecting one AS using a shorter BS instead of protecting the entire AP using a longer BP (as in path protection), one can achieve a fast recovery time. More specifically, given an AP (or AS) of length (e.g., in hops) $H_a$ and its corresponding BP (or BS) of length $H_b$, and let the time to process/forward an alarm (failure notification) signal at every hop be $S_1$, and the time to configure each node along the BP (or BS) be $S_2$. The average recovery time is proportional to $$S_1 \cdot \frac{H_a}{2} + S_2 \cdot H_b,$$

where the first term accounts for the time for an alarm signal to reach either the starting or the ending point of the path (or segment), and the second term accounts for the time to set up the BP (or BS). Since $S_2$ is usually larger than $S_1$, and $H_b$ can be more than twice of that $$\frac{H_a}{2},$$

the second term dominates. This is also why link protection will not achieve a much faster recovery than PROMISE (as they have more or less the same second term).

Figure 2A:
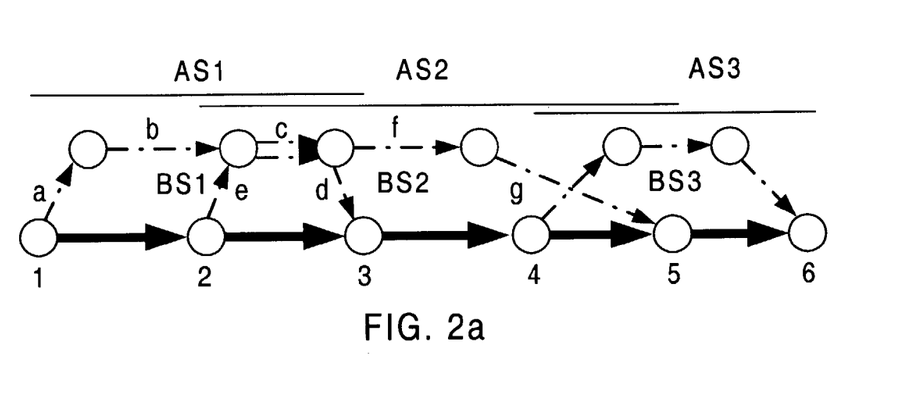
FIGS. 2a and 2b illustrate the PROMISE protection framework of the present invention.
Figure 2B:
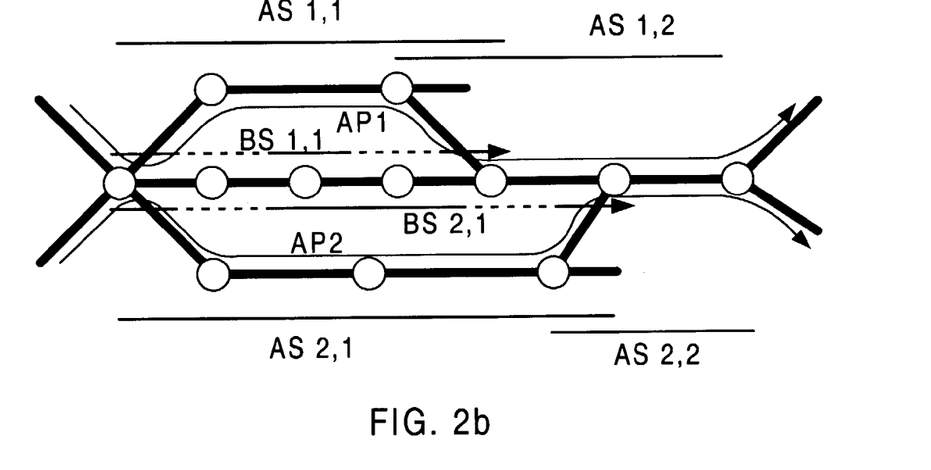

Another primary benefit of PROMISE is that, while path protection is considered to be among the most bandwidth efficient approaches, PROMISE can be even more bandwidth efficient due to the tremendous amount of flexibility it offers in choosing the appropriate ASs and their corresponding BSs. More specifically, such flexibility can lead to a higher degree of backup bandwidth sharing not only among BSs for different APs, but also among BSs for the same AP. As an example, consider FIG. 2b, It is clear that since AP1 and AP2 are not link-disjoint, their BPs cannot share backup bandwidth in path protection. However, the two BSs, namely $BS_{1,1}$ and $BS_{2,1}$, can share backup bandwidth as their corresponding AS's are link-disjoint. An example showing bandwidth sharing among the BSs for the same AP is shown In FIG. 2a (where BS1 and BS2 share backup bandwidth on link c).

Accordingly, while previous work in path protection (where fixed APs are used), investigated the tradeoffs between the BP length and bandwidth efficiency, and found that in order to reduce the BP length, one has to sacrifice backup bandwidth sharing and thus bandwidth efficiency, PROMISE can potentially achieve higher bandwidth efficiency and faster recovery at the same time when compared to path protection.

PROMISE can also tolerate more multiple failures than path protection (with the same or lower bandwidth consumption). For example, consider FIG. 1c, and let x and y be the reliability of the ASs from node S to node 2, and from node 2 to node d, respectively, and p and q be the reliability of the their corresponding BSs, respectively, and further assume that these probability are all independent of each other. Then, when x=y=p=q=0.8, the reliability of the AP (consisting of AS1 and AS2) and BP (consisting of BS1 and BS2) in path protection are 0.64 each, respectively, resulting in an overall (i.e., end-to-end) reliability of around 0.87 (=1−(1−0.64)$^2$). However, in PROMISE, node s (or 2) can reach node 2 (or d, respectively), unless both the AS1 (or AS2) and its corresponding BS1 (or BS2) fail (whose probability is (1−0.8)$^2$=0.04). Hence, the overall reliability is 0.96$^2$=0.92, which is higher than that achieved in path protection.

Finally, the tremendous amount of flexibility of PROMISE allows us to provide protection successfully when both link and path protection cannot. An example of PROMISE is illustrated in FIG. 2a, where the AP from node 1 to node 6, shown in bold, has been chosen, either because it is the only one that satisfies the required routing policies or QoS constraints (e.g., hop limit), or simply as a result of using some heuristics (such as APF mentioned earlier). In PROMISE, the AP is partitioned into three overlapping ASs, AS1 (from node 1 to node 3), AS2 (from node 2 to node 5) and AS3 (from node 4 to node 6), each of which is protected by a corresponding BS shown as a dashed line.

However, assuming no other links (including those that use the same physical links shown in the figure but in the opposite direction), are available, path protection does not work because there exists no link disjoint BP. Furthermore, link protection does not work either since there is no detour for all links along AP except links from node 2 to node 3. Even approaches of variations of the link/path protection will fail because there is no detour from node 3 and 5 (to any of their downstream nodes).

Note that, in the above example, the possible reasons for not consolidating the first two ASs into one (from node 1 to node 5), and their corresponding BSs into one BS (using links a, b, c, f, g) include (1) we want to limit the hop number on any BS to no more than four (in order to guarantee a fast recovery, or the received quality of the re-routed signals, for example), (2) we want to reduce additional backup bandwidth needed to protect the connection, by allowing BS1 and BS2 to share more backup bandwidth with other existing BSs (besides the fact that BS1 and BS2 can share the backup bandwidth on link c), and (3) in case the link from node 2 to node 3 is highly susceptible to failure, we want to achieve extra protection against a combined failure of this link and the failure of any one of the following links: a, b, f, g (which otherwise cannot be handled).

In addition, when backup bandwidth is utilized by preemptable traffic under normal fault-free situations, a failure along an AS, for example, will disrupt pre-emptable traffic carried on its corresponding BS only, instead of all the pre-emptable traffic carried on the BP as in path protection). As mentioned earlier, a key technical hurdle to be overcome in the proposed research is how to divide a given AP into ASs and select corresponding BSs, and deal with the complexity that often comes as a price to be paid for the flexibility.

In the on-line case, we considered where complete aggregate information on existing connections and link status is available, and studied two APF-PBC based PROMISE approaches to be referred as PCI-P (for PROMISE with Complete Information with PBC). More specifically, in either of these two PCI-P approaches, the AP for a given request is determined first by assigning each link the same PBC as that used in DPIM, and then using a modified Bellman-Ford algorithm to find a minimum-cost path, taking into consideration the limitation on the AP's hop count (AHC), if any.

The difference between the two approaches, which are to be further classified as PCI-PI (where I is for ILP) and PCI-PD (where D is for dynamic programming), respectively, is that the former uses ILP to select an optimal set of BSs for the given AP, and the latter uses dynamic programming techniques with a polynomial-time complexity. Both approaches take into the sharing of backup bandwidth among BSs for different APs as well as for the same AP, and in particular, are capable of incorporating QoS constraints such as the limitation on the BSs hop count (or BHC). The PCI-PD, however, cannot take the full advantage of the backup bandwidth sharing among the BSs for the same AP.

Figure 3A:
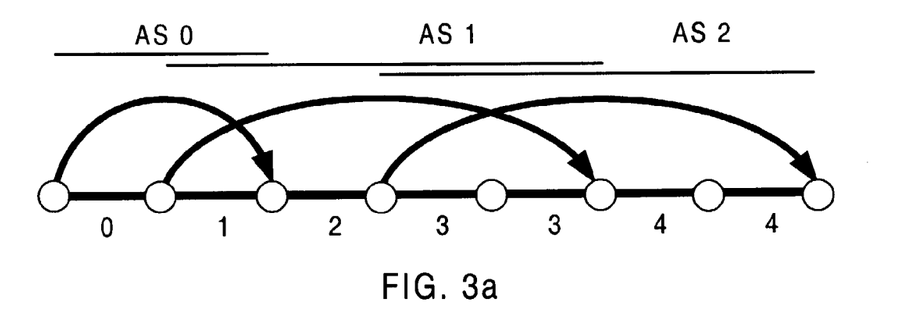
FIGS. 3a and 3b illustrate two possible mappings for a 7-link AP in the PROMISE protection framework of the present invention; and, FIGS. 4a, 4b and 4c illustrate three steps of dynamic programming.
Figure 3B:
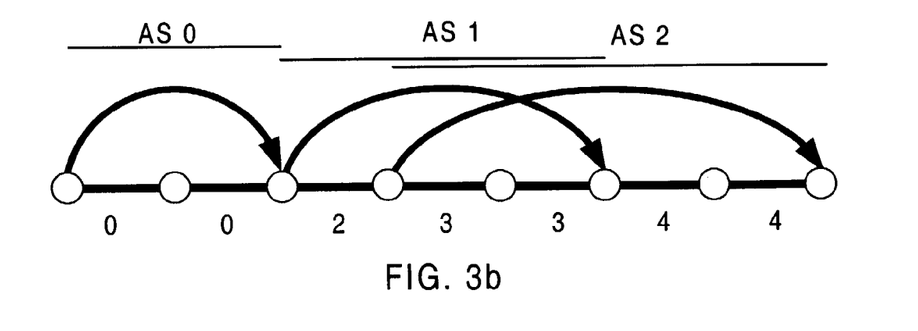

It turned out that the ILP formation in PCI-PI is much more challenging than that for path and link protection since in PROMISE, ASs are allowed to overlap with one another, making it difficult to formulate the constraints. We addressed the challenge by developing a unique link-labeling scheme that labels each link along the given AP such that there is a one-to-one mapping between how the links are labeled and how the AP is divided (and thus protected with BSs). FIG. 3 shows two possible mappings for a 7-link AP. As can be seen from the example, the labels (integer numbers) are assigned to the links along an AP in an ascending order, by labeling the first link along an AP with 0. If a node does not start or end an AS, then the link following it will have the same label as the link preceding it. Otherwise, if $AS_k$ (only) ends at a node (except if it is a destination node), the links preceding and following it will have a label of 2k+1 and 2k+2, respectively. If $AS_{k+1}$ (only) starts at a node, then those links will be labeled 2k and 2k+1, respectively. Finally, if ASk ends and ASk+1 starts at the same node, the two labels will be 2k and 2k+2, respectively. By taking advantage of the fact that in PROMISE, no AS's should be a proper subset (in terms of links) of another AS or the union of two other AS's, we can exclude some combinations of link labels, such as 2k−1 and 2k+1 for any two consecutive links, from the ILP formulation recited infra.

The basic idea of the ILP formulation is that if we can compare all feasible backup segment sets corresponding to given segmentation of an active path, we can select the best BS set as a candidate solution. Then, for all possible segmentations of the active path, the best candidate will be the optimal solution.

The following symbols are used in the ILP formulation:
H: Hop number of active path
S: Set of Backup Segments. |S|≦H.
$\overline{S}$: Specified maximal size of Backup Segment Set. We can specify it with an appropriate value (up to H) to get a sub-optimal result in less time. If $\overline{S}$ is set to 1, the ILP below is reduced to node-disjoint path protection. If |S| equals to H in solution, it is same as link protection.
A. Label links ($a_i$) on active path as discussed above. For the i th and i+1 th link on active path, we have $L_{a_i} \leq L_{a_{i+1}} \leq L_{a_i}+2$ i≧0. In addition, we specify $L_{a_0}=0$. Using a failure notification/signaling protocol called UON (to be discusses later) for example, the kth BS protects links labeled with 2k−1 or 2k.
B. Label-based Integer Linear Programming $S_{k_e}$ Should be 1 if link e is used in or protected by the kth BS, 0 or else. Subscript k is from 0 to $\overline{S-1}$.

f(n) Set of all none-active links beginning with node n.
t(n) Set of all none-active links ending with node n.

$$S_{kf}(n) = \sum_{e \in f(n)} S_{k_e}.$$

Should be 1 if node n is the beginning of BS k, 0 or else.

$$S_{kt}(n) = \sum_{e \in t(n)} S_{k_e}.$$

Should be 1 if node n is the ending of BS k, 0 or else.
$L_e$ Label of link e on active path.
$L_{in}(n)$ In Label of node n, i.e. the label of the link preceding n along active path.
$L_{in}(n)$ Out Label of node n, i.e. the label of the link following n along active path.

$BC_a^b$: Additional BBW needed on link b in order to use it as a part of a backup segment for an active segment traversing link a. Its value depends on which BBW estimation method is used. [37]
$BC^e$ Estimated additional BBW needed on link e.

Objective:

$$\min \sum_{e \in E} BC^e$$

Constraints:

$$L_{a_0} = 0 \tag{1}$$

$$S_{kf}(n) = \sum_{r \in g(n)} S_{k_e} \quad S_{kf}(n) = \sum_{e \in f(n)} S_{k_e} \tag{2}$$

$$S_{kt}(n) = \sum_{e \in t(n)} S_{k_e} \tag{3}$$

$$S_{0f}(n) = 1, S_{kf}(n) = 0(k > 0), S_{kt}(n) = 0 \quad n = s \tag{4}$$

$$S_{kf}(n) = 0, \sum_k S_{kt}(n) = 1 \quad n = d \tag{5}$$

$$\left.\begin{aligned} S_f(n) &= \sum_k S_{kf}(n), S_t(n) = \sum_k S_{kt}(n) \quad \text{(i)} \\ S_f(n) &+ S_t(n) = L_{out}(n) - L_{in}(n) \\ (&\Rightarrow L_{ai} \leq L_{ai+1} \leq L_{a_i} + 2(H-1 > i \geq 0)) \quad \text{(ii)} \\ M_f(n) &= L_{in}(n) - \sum_k 2(k-1)S_{kf}(n) \quad \text{(iii)} \\ M_f(n) &\leq T(1 - S_f(n)) \quad \text{(iv)} \\ M_t(n) &= L_{out}(n) - \sum_k 2(k+1)S_{kt}(n) \quad \text{(v)} \\ M_t(n) &\leq T(1 - S_t(n)) \quad \text{(vi)} \end{aligned}\right\} n \neq s, d \tag{6}$$

$n \in$ (active path nodes)

$$S_{kf}(n) = S_{kt}(n) \quad n \in \text{(non-active path modes)} \tag{7}$$

$$\left.\begin{aligned} M_1(a) &= \sum_k 2k \cdot S_{k_a} - L_a \\ \sum_k S_{k_a} &= 1 \end{aligned}\right\} a \in \text{(active pathlinks)} \tag{8}$$

$BC^b \geq BC_a^b(S_{k_a} + S_{k_b} - 1) \quad \forall\, a \in$ (active pathlinks), \hfill (9)

$\forall\, b \in$ (none-active pathlinks)

$BC^b \geq BC_a^b(S_{k_a} + S_{k_b} - 1) \quad \forall\, a \in$ (active pathlinks), \hfill (9)

$\forall\, b \in$ (none-active pathlinks)

$$S_{k_e}, S_{kf}(n), S_{kt}(n), S_f(n), S_t(n) \in \{0, 1\} \tag{10}$$

$$w \geq BC^e \geq 0 \tag{11}$$

$$1 \geq M_1(a), M_f(n), M_t(n) \geq 0 \tag{12}$$

$$T \geq L_a \geq 0 \tag{13}$$

In objective function, since we already have active path (and required active bandwidth), we only need count backup bandwidth requirement.

Equation (4) shows source node should be (and only be) the beginning of the first backup segment, while Equation (5) shows destination node should be the ending of one backup segment.

Equation (6) is designed according to the mapping from label serial to segmentation of active path in above section. T is any integer larger than maximal possible label value, which is $(2\overline{S}-2)$. Then $S_{kf}(n)$ can be set to 1, only when $L_{in}(n)=2k-2$ (Equation (6)-iii, iv), and $S_{kt}(n)$ can be set to 1, only when $L_{out}(n)=2k+2$ (Equation (6)-v,vi). Now we can explain why in and out label pair for a node cannot be (2k−1, 2k+1), since this case cannot satisfy Equation (6) altogether. i.e., the node should have two cases of beginning/ending of some segment (Equation (6)-i, ii), but this assumption will conflict with other equations (Equation (6) iii-vi).

Equation (7) shows flow-balance on nodes that are not along the active path. If we add additional constraint $$\sum_k S_{k_e} \le 1,$$

we can get no-intra-sharing model.

From Equation (8) $S_{k_a}$ will be set to 1, only when $2k-1 \le L_a \le 2k$. i.e., active link a is protected by the k-th BS.

Equation (9), shows that least additional backup bandwidth required on link b if active link a is protected by a BS traversing link b.

Moreover, if we want limit the hop number of each BS by m, we can add below constraint.

$$\sum_{e \in (\text{none-active links})} S_{k_e} \le m$$

In the ILP for normal shared path protection problem, there are $O(E)$ variables, and $O(E_2)$ constraints. For PCI-PI, by limiting S (maximal size of BS set) to an appropriate number, such as 5, there will be $O(S \cdot E)$ variables, and $O(S \cdot E)$ constraints, which make our ILP formulation a more practical solution. For example, on a Pentium IV 1.7 GHz PC, for a large network, such as USnet (with 46 nodes and 76 bi-directed edges), the average computing time for each request will be 1.8 seconds using the PCI-PI model.

Note that, in the above, we assume that the AP is obtained by using the PBC heuristic. We may instead test all possible active paths, and apply the above process to each of them, to get an absolutely optimal solution for a given connection request. Such an ILP solution will be very time-consuming and is likely not to be feasible for a large network.

Although solving the ILP formulation will result in an "optimal" selection of ASs and their corresponding BSs for a given AP, its exponential time complexity also makes it impractical for very large networks. To describe the basic idea of PCI-PD, let $H_a$ be the APs hop count (AHC), and the nodes along the AP be numbered from 0 to $H_a$. In addition, let $B_{i,j}$, where $0 \le i < j \le H_a$, be the minimum-cost BS if the corresponding AS covers node i to node j, which can be found by using the same polynomial time algorithm for finding the minimal cost BP as that used by APF-PBC discussed earlier. Finally, let $D_{i,j}$ be the "best" way (known to dynamic programming) to protect the AP from node i to node j by possibly dividing it into multiple overlapped ASs, and protecting them with corresponding BSs, without considering how other parts of the AP are protected.

Figure 4A:
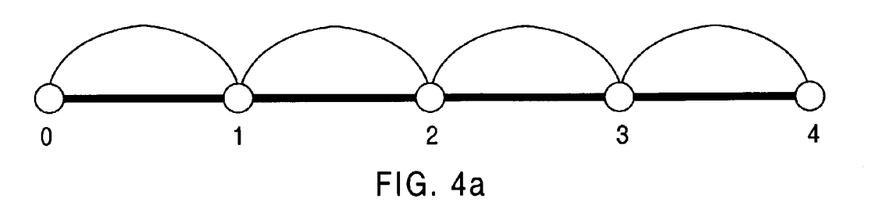
Figure 4B:
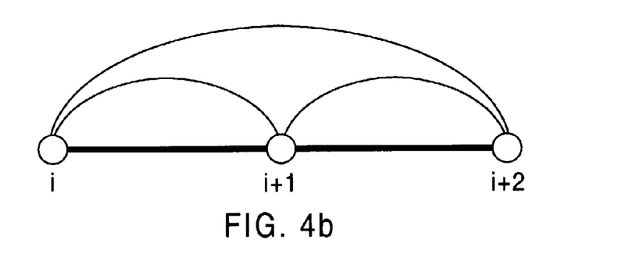
Figure 4C:
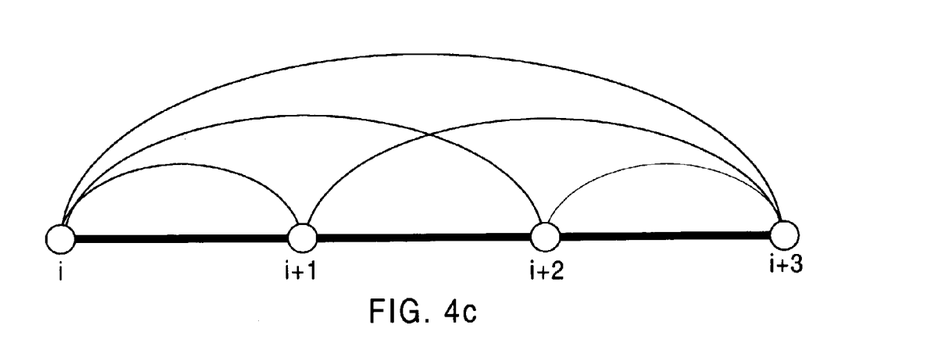

PCI-PD works as follows: in Step 1, pick $B_{i,i+1}$ to be $D_{i,i+1}$ (see FIG. 4a); In Step 2, pick either the combination of $D_{i,i+1}$ with $D_{i+1,i+2}$, or $B_{i,i+2}$, whichever is better, to be $D_{i,i+2}$ (see FIG. 4b); In Step 3, pick the best among the following four choices to be $D_{i,i+3}$ (see FIG. 4c): the combination of $D_{i,i+1}$ with $D_{i+1,i+3}$, the combination of $D_{i,i+2}$ with $D_{i+1,i+3}$, the combination of $D_{i,i+2}$ with $D_{i+2,i+3}$, and $B_{i,i+3}$. The process ends when $D_{0,Ha}$ is decided (after the $H_a$-th step).

Let Comb (X,Y) denote a function which accepts two BS sets X and Y as parameters, and outputs a new minimal-cost BS set, which is essentially a union of the two BS sets (without any redundancy). More specifically, it can be implemented heuristically as follows: It sorts all the BSs from the two BS sets, X and Y, in the decreasing order of average per-active-link-cost, defined to be the total (minimum) cost of a BS divided by the number of links of the AS it covers. Then each BS is examined to see if it can be removed. For example, if a BS is redundant, i.e., the links on the corresponding AS are also covered/protected by another BS (or a combination of other BSs) in sets X and Y (with a lower cost), then the redundant BS (with the higher cost) may be removed.

In addition, let JT be a variable that can be used to specify whether we want to protect against all single-link failure or all single-node failure. Its value is set to 0 if we want the former or 1 otherwise. The pseudo-code of the algorithm is shown below.

```
for m = 1 + JT to H_a do
    for i = 0 to H_a - m do
        D_{i,i+m} ← B_{i,i+m}
        for j = 1 + JT (up) to m - 1 do
            for k = 1 to j - JT do
                D_{i,i+m} ← min(Comb(D_{i,i+j}, D_{i+k,i+m}),D_{i,i+m})
            end for
        end for
    end for
end for
```

Note that in the above pseudo-code, when m=2, the last for loop involving j will not execute as the minimum value of j is 2 (but m−1=1). Once the BS set is chosen, minimum amount of additional backup bandwidth will be allocated on each link along one or more BSs, taking into consideration all the active links that are "protected" by the one or more BSs. Due to inter-BS (intra-BP) as well as inter-BP backup bandwidth sharing, dynamic programming can obtain near-optimal results.

Although the above description assumes that a centralized controller with complete aggregation information (e.g., $S_a^b$), it can be extended to centralized control with partial information only (e.g., PAe as in DPIM), distributed control with complete information (as DCIM), or distributed control with partial information (as DPIM).

Clearly, by allowing an AP to be divided into multiple ASs, PROMISE facilitates distributed control with only partial information even more. For example, each node may only need to maintain $\{S_a^l | a \in E\}$ and $\{S_l^b | b \in E$ for each link l that is local (i.e., attached) to the node. Moreover, it may only need to maintain information such as $B_r$ and $P_{Ar}$ for remote links r that are less than $H_b$ hops away, where $H_b$ is the limit on the length of a BS, instead of every remote link as in DPIM. In addition, new partial aggregate information and distributed protocols for signaling and for exchanging partial information may also be defined and used.

Note that for the off-line case, any algorithm developed for the on-line case can be applied by processing one request at a time, selected in a random order or according to other ordering heuristics (such as the one which processes first the request with the highest bandwidth requirement, or the longest path length, or maximal value of the product of the above two). In other words, our algorithm can be extended to the off-line case.

We propose the following three schemes that propagate the alarm (failure notification) signals upstream only (by the upstream node) called UON, downstream only (by the downstream node) called DON, and in both directions (by both upstream and downstream nodes) called BDN, respectively.

We also propose the following corresponding signaling protocols to set up the BSs for re-routing in PROMISE. For example, in UON, it is natural for the first (nearest) upstream node that originates a BS to initiate the re-routing process. To reduce signaling delay (and recovery time), the node can send a setup packet along the BS, followed by re-routed traffic before receiving any acknowledgment from the node where the BS ends (similar to Optical Burst Switching or other one-way forward reservation protocols. In DON, the first downstream node that ends a BS will send a set-up packet along the BS similar to destination-initiated (i.e., backward) reservation protocols. When the set-up packet reaches the origin of the BS, traffic can be re-routed immediately. Note that due to the criss-cross nature of the BSs, these two schemes may set up and use two different BSs. The advantage of using the third BDN scheme can be illustrated by assuming that a link with label 3 in FIG. 3a failed, whose upstream node is the 4th from left (which originates BS2), and whose downstream node is the 6th from left (which ends BS1). These two nodes may coordinate so that a more suitable (e.g., shorter) BS will be selected to re-route traffic. Re-routing may also take place along both BSs. In such a case, BS2 can be used to re-route some traffic which has already passed the originating node for BS1 (e.g., on the link labeled 2), and BS1 can be used to re-route other affected traffic (note that those already in-transit on the failed link will be lost).

Although multiple failures (other than e.g., multiple link failures caused by a single node failure) are rare, the higher the reliability of a connection can achieve, the better. We can take a "best-effort" approach to fault recovery from possible multiple failures in a mesh network adopting PROMISE.

One problem is that, since it may take a while for a failure to be repaired, the traffic with affected AP (referred to as TAA), which is now being re-routed, as well as the traffic with affected BS (or TAB), needs to be protected against further failures. We provide the following two possible post-recovery schemes: one treats the detour currently used by TAA as an AP, and finds new BS's for it, and finds new BS's for the AP used by TAB; and the other finds two brand new APs and corresponding BSs for TAA and TAB, respectively. In either approach, the bandwidth along any old AP and/or BSs that is no longer needed will be released afterwards. Note that, it is possible that such post-recovery operations will fail due to insufficient bandwidth.

Our preliminary results have shown that these two approaches, especially PCI-PD, perform extremely well when compared to existing shared path protection schemes using complete information, such as SCI-I (where I stands for ILP), and SCI-P (where P stands for APF-PBC). In addition, we also investigate their corresponding approaches under DPIM framework, DPIM-I, DPIM-P, PPI-PI, PPI-PD, respectively. More specifically, we have simulated these eight approaches assuming random requests and various network topologies, and the following is typical results that have been obtained for a large network called USnet (with 46 nodes and 76 bi-directed edges).

Table 1 shows the average bandwidth saving ratio (BSR), defined to be the total bandwidth consumed by each of the eight approaches over that by an approach that allows no backup bandwidth sharing, as well as the average BSs hop count (or BHC) assuming there is no limits on either AHC or BHC. It is clear that PCI-PD can achieve fastest recovery and in addition, a BSR that is just a little below that of PCI-PI, but still higher than that of SCI-I which is more time-consuming, and recovers more slowly.

We have also considered the case with limited AHC and BHC due to routing policy and/or QoS constraints. More specifically, let $\alpha$ and $\beta$ be two parameters that are slightly larger than 1, and L be the length (hop count) of the shortest path from the source to destination of the requested connection. Then, AHC is limited to $\alpha \cdot L$, and BHC is limited to max $\beta \cdot L$, m, where m$\geq$3 is used to relax the limit on BHC in case L is too small, e.g., 1. Our results have shown that even with m=4, and $\beta$=1.4, path protection may fail to accommodate certain requests because of the limit on BHC (and in part on AHC), and the sparseness of the network's physical connectivity (even though each link may have infinite bandwidth). However, both PCI-P approaches can successfully accommodate all the requests. Table 2 shows either the average BSR (in case of no rejected requests) or the Drop Ratio (DR) (in case of any rejected requests) when $\alpha$=1.2.

In addition, Table 1 and 2 also show the performance of the schemes under DPIM framework is in conformity with that of schemes using complete information.

TABLE 1

Bandwidth Sharing Ratio & BSs Hop Count

| Schemes | BSR | BHC |
|---|---|---|
| SCI-I | 34.0% | 11.3 |
| SCI-P | 35.7% | 10.3 |
| PCI-PI | 36.9% | 8.1 |
| PCI-PD | 36.0% | 6.2 |
| DPIM-I | 25.7% | 6.9 |
| DPIM-P | 29.6% | 8.9 |
| PPI-PI | 29.1% | 5.4 |
| PPI-PD | 28.9% | 4.2 |

TABLE 2

Bandwidth Sharing or Drop Ratio with limited BHC

| Schemes | $\beta = 1.4$ | | $\beta = 1.2$ | | $\beta = 1.0$ | |
|---|---|---|---|---|---|---|
| | BSR | DR | BSR | DR | BSR | DR |
| SCI-I | | 12.0% | | 23.5% | | 26.0% |
| SCI-P | | 16.5% | | 30.0% | | 48.5% |
| PCI-PI | 35.3% | | 33.6% | | 32.2% | |
| PCI-PD | 33.6% | | 32.7% | | 31.0% | |
| DPIM-I | | 16.5% | | 21.0% | | 23.5% |
| DPIM-P | | 25.5% | | 45.5% | | 71.5% |
| PPI-PI | | 6.0% | | 14.0% | | 16.5% |
| PPI-PD | | 5.5% | | 14.0% | | 16.0% |

As mentioned above, to achieve bandwidth efficiency and at the same time, fast recovery using scalable algorithms is very challenging, and all existing approaches settle for some kind of trade-offs.

Thus, it is seen that the major challenges faced in designing survivable schemes are how to allocate minimal amount of spare resources (e.g., bandwidth) (and thus achieve a maximal efficiency), using scalable (e.g., fast polynomial-time) algorithms, and in case a failure occurs, be able to quickly recover from it (i.e., by re-routing affected traffic using the spare resources). Shared path protection is known to be very bandwidth efficient but its restoration time could be too long. Existing efforts in achieving maximal bandwidth efficiency often resort to time-consuming integer linear programming (ILP) which is not tractable/feasible for large-scale networks.

Other heuristic approaches sacrifice bandwidth efficiency, or trade recovery time for bandwidth efficiency. Our novel survivability framework called PROMISE (PRotection using MultIple SEgments) extends our ground-breaking work on shared path protection scheme called "Distributed Partial Information Management" or DPIM. Using innovative path determination and segmentation algorithms, our protection scheme can achieve even better bandwidth efficiency than shared path protection and yet achieve a shorter recovery time. Our heuristic-based algorithms are ultra-fast and therefore applicable to very large networks, while being able to obtain close-to-optimal results. Our ILP formulation-based algorithms uses a novel link-labeling scheme to drastically reduce the number of variables and thus can run fast enough for medium-size networks (a few hundred nodes) to obtain optimal results. It results in a more resilient network than using other existing approaches which may fail to provide protection, especially when multiple failures are possible. The PROMISE framework also contains failure notification and restoration signaling protocols, and is also applicable to cases with either complete or partial aggregate information and to both on-line and off-line cases. It is also amendable to distributed control implementation.

The PROMISE framework and approaches are applicable to a wide range of networking technologies including IP, ATM, SONET and WDM networks under the Generalized Multi-protocol Label Switched (G-MPLS) framework, and some of the new algorithms, simulation and emulation tools, and performance results generated from this research are expected to be adopted by the networking industry at-large.

Thus, it is seen that the objects of the present invention are efficiently obtained, although modifications to the invention may be obvious to those having ordinary skill in the art, and these changes are intended to be within the spirit and scope of the invention as claimed. It should be clear that the present invention offers fast recovery yet highest bandwidth efficiency (better than shared path protection), and is more resilient, able to tolerate more multiple failures than path protection (with the same or lower bandwidth consumption), and can succeed where others fail.

What is claimed is:

1. A method of providing failure protection in a network, said method comprising:
    selecting at least first and second active segments for an active path of a network, the active path to provide data from a source node to a destination node of the active path, said active path comprising a plurality of nodes, including the source node, the destination node and one or more nodes disposed therebetween, wherein the first active segment is from a first node to a second node of the active path, and the second active segment is from a third node to a fourth node of the active path, the third node being different than the second node, and wherein the first and second active segments at least partially overlap and less than fully overlap; and
    selecting at least first and second backup segments for the at least first and second active segments, respectively, wherein the first backup segment and the second backup segment share a same bandwidth, and the first backup segment starts at the first node and ends at the second node, and the second backup segment starts at the third node and ends at the fourth node, wherein the first and second backup segments are otherwise node-disjoint with the first and second active segments, respectively, and wherein the selection of the first and second active segments and the selection of the first and second backup segments are performed by a computer specially programmed to perform the selecting of the first and second active segments and the selecting of the first and second backup segments.

2. The method of claim 1, wherein the active path, the at least first and second active segments and the at least first and second backup segments are selected to minimize total bandwidth used by the active path and the at least first and second backup segments.

3. The method of claim 1, wherein the selecting the at least first and second active segments comprises partitioning the active path to provide the at least first and second active segments.

4. The method of claim 1, wherein the selecting comprises selecting only two active segments, the first active segment and the second active segment, and wherein the first node is the source node and the fourth node is the destination node.

5. The method of claim 1, wherein the selecting comprises selecting more than two active segments, wherein the more than two active segments includes at least the first active segment and the second active segment, and wherein one active segment of the more than two active segments starts at the source node and another active segment of the more than two active segments ends at the destination node, and at least two active segments of the more than two active segments overlap.

6. The method of claim 1, wherein there is another active path of the network, said another active path having a backup segment, and wherein the backup segment of the another active path shares bandwidth with at least one of the first backup segment or the second backup segment.

7. The method of claim 1, wherein said each active segment comprises a single link, and said method further comprises emulating a link protection scheme.

8. The method of claim 1, wherein another active path of the network comprises a single active segment, and said method further comprises emulating a path protection scheme.

9. The method of claim 1, wherein in response to a failure of a link in one of the first active segment and the second active segment, pre-emptable traffic carried by one of the first backup segment and the second backup segment corresponding to the failed active segment is disrupted, wherein disruption is limited to the backup segment corresponding to the failed active segment.

10. The method of claim 1, wherein selecting at least one of the first backup segment and the second backup segment comprises using integer linear programming.

11. The method of claim 1, wherein selecting at least one of the first backup segment and the second backup segment comprises using a heuristic.

12. The method of claim 1, wherein selecting at least one of the first backup segment and the second backup segment comprises using a control scheme selected from a group of control schemes including centralized control with complete information, centralized control with partial information, distributed control with complete information, and distributed control with partial information.

13. The method of claim 1, wherein selecting at least one of the first backup segment and the second backup segment comprises selecting for a case selected from a group of cases including an on-line case and an off-line case.

14. The method of claim 1, wherein the third node is between the first node and the second node, such that the first active segment is from the first node to the second node via the third node, and the second active segment is from the third node to the fourth node via the second node, and wherein in response to a failure of a link on the first active segment between the first node and the third node, selecting the first backup segment, and in response to another failure of a link on the second active segment between the second node and the fourth node, reversing data from the second node to the third node and then selecting the second backup segment.

15. An apparatus of providing failure protection in a network, said apparatus comprising:
    means for selecting at least first and second active segments for an active path of a network, the active path to provide data from a source node to a destination node of the active path, said active path comprising a plurality of nodes, including the source node, the destination node and one or more nodes disposed therebetween, wherein the first active segment is from a first node to a second node of the active path, and the second active segment is from a third node to a fourth node of the active path, the third node being different than the second node, and wherein the first and second active segments at least partially overlap and less than fully overlap; and
    means for selecting at least first and second backup segments for the at least first and second active segments, respectively, wherein the first backup segment and the second backup segment share a same bandwidth, and the first backup segment starts at the first node and ends at the second node, and the second backup segment starts at the third node and ends at the fourth node, wherein the first and second backup segments are otherwise node-disjoint with the first and second active segments, respectively, and wherein the means for selecting the first and second active segments and the means for selecting the first and second backup segments are included in at least one specially programmed computer.

16. The apparatus of claim 15, wherein the active path, the at least first and second active segments and the at least first and second backup segments are selected to minimize total bandwidth used by the active path and the at least first and second backup segments.

17. The apparatus of claim 15, wherein the means for selecting the at least first and second active segments comprises means for partitioning the active path to provide the at least first and second active segments.

18. The apparatus of claim 15, wherein the means for selecting comprises means for selecting only two active segments, the first active segment and the second active segment, and wherein the first node is the source node and the fourth node is the destination node.

19. The apparatus of claim 15, wherein the means for selecting comprises means for selecting more than two active segments, wherein the more than two active segments includes at least the first active segment and the second active segment, and wherein one active segment of the more than two active segments starts at the source node and another active segment of the more than two active segments ends at the destination node, and at least two active segments of the more than two active segments overlap.

20. The apparatus of claim 15, wherein there is another active path of the network, said another active path having a backup segment, and wherein the backup segment of the another active path shares bandwidth with at least one of the first backup segment or the second backup segment.

21. The apparatus of claim 15, wherein said each active segment comprises a single link, and said apparatus further comprises means for emulating a link protection scheme.

22. The apparatus of claim 15, wherein another active path of the network comprises a single active segment, and said apparatus further comprises means for emulating a path protection scheme.

23. The apparatus of claim 15, wherein in response to a failure of a link in one of the first active segment and the second active segment, pre-emptable traffic carried by one of the first backup segment and the second backup segment corresponding to the failed active segment is disrupted, wherein disruption is limited to the backup segment corresponding to the failed active segment.

24. The apparatus of claim 15, wherein the means for selecting at least one of the first backup segment and the second backup segment comprises means for using integer linear programming.

25. The apparatus of claim 15, wherein the means for selecting at least one of the first backup segment and the second backup segment comprises means for using a heuristic.

26. The apparatus of claim 15, wherein the means for selecting at least one of the first backup segment and the second backup segment comprises means for using a control scheme selected from a group of control schemes including centralized control with complete information, centralized control with partial information, distributed control with complete information, and distributed control with partial information.

27. The apparatus of claim 15, wherein the means for selecting at least one of the first backup segment and the second backup segment comprises means for selecting for a case selected from a group of cases including an on-line case and an off-line case.

28. The apparatus of claim 15, wherein the third node is between the first node and the second node, such that the first active segment is from the first node to the second node via the third node, and the second active segment is from the third node to the fourth node via the second node, and wherein in response to a failure of a link on the first active segment between the first node and the third node, the first backup segment is selected, and in response to another failure of a link on the second active segment between the second node and the fourth node, data is reversed from the second node to the third node and then the second backup segment is selected.

* * * * *